2,749,355

ACRYLAMIDES

Wilford Donald Jones, Summit, N. J., assignor to Celanese Corporation of America, New York, N. Y., a corporation of Delaware No Drawing. Application October 16, 1952,
Serial No. 315,200

1 Claim. (Cl. 260—326.3)

This invention relates to the production of N-substituted acrylamides and more particularly to the production of N-acrylylpyrrolidine.

It is an object of my invention to provide an improved process for the production of N-substituted acrylamides in good yields from the corresponding hydracrylamides.

A further object of my invention is the provision of an improved method of making N-acrylylpyrrolidine.

Still another object of my invention is the preparation of a new chemical compound, N-hydracrylylpyrrolidine.

Other objects of this invention will be apparent from the following detailed description and claims.

I have found that N-substituted acrylamides may be produced in superior yields by the dehydration of the corresponding N-substituted hydracrylamides in the presence of a thoria-alumina catalyst.

In the N-substituted hydracrylamides which may be employed in practicing this invention the substituent is joined to the amide nitrogen by a carbon-to-nitrogen bond. The N-substituent may be aliphatic, cycloaliphatic aromatic, or heterocyclic, and there may be one or two such substituents. The nitrogen may form part of a ring, as when the substituent is an alkylene radical having both valences attached to the nitrogen. Examples of compounds which may be dehydrated according to my invention are N-methyl hydracrylamide, N-phenyl hydracrylamide, the hydracrylamide of pyrrolidine, N,N-dimethyl hydracrylamide, N,N-diethyl hydracrylamide, N-isopropyl hydracrylamide, N-butyl hydracrylamide, N-isoamyl hydracrylamide, N,N-di-isobutyl hydracrylamide, N,N-di-t-butyl hydracrylamide, N-dodecyl hydracrylamide, N-cyclopentyl hydracrylamide, N-cyclohexyl hydracrylamide, N,N-dicyclo hexyl hydracrylamide, N-N-diphenyl hydracrylamide, N-benzyl hydracrylamide, N,N-dibenzyl hydracrylamide, N-methyl-N-phenyl hydracrylamide, N-(o-chlorophenyl) hydracrylamide, N-(p-tolyl) hydracrylamide, N - hydracrylpiperidine, N - hydracrylylmorpholine, N-(α-pyridyl) hydracrylamide, N-(α-thienyl) hydracrylamide, N-(α-thenyl) hydracrylamide and N-hydracrylylcarbazole.

The thoria-alumina catalyst used in the practice of this invention is preferably in the form of particles of activated alumina impregnated with thoria. Desirably the particle size of the catalyst is about 2 to 16 mesh when the catalyst is used as a fixed bed. However, the catalyst may be employed in fluidized form in which case the particle size is much smaller. The dehydration reaction may be carried out by passing vapors of the N-substituted hydracrylamide over the thoria-alumina catalyst, preferably maintaining the catalyst at a temperature in the range of about 200 to 400° C. Optimum results are obtained when the catalyst temperature is about 275 to 325° C. The space velocity of the hydracrylamide with respect to the catalyst may be varied widely, for example space velocities (S. T. P.) of 5 to 500 per hour may be employed.

The dehydration step may be carried out under atmospheric, superatmospheric or subatmospheric pressures. In most cases, due to high boiling points of the hydracrylamides, I employ subatmospheric pressures, such as pressures of about 0.1 to 300 mm. of mercury absolute.

Sometimes the N-substituted acrylamide which is produced tends to polymerize during the reaction. If desired, such polymerization may be minimized by carrying out the dehydration in the presence of a small amount of an inhibitor for the polymerization, e. g. trinitrobenzene, phenol, catechol, t-butylcatechol, diamyl phenol, naphthol or aniline.

The hydracrylamides employed as starting materials in my invention may be produced by reacting beta-pripiolactone with an amine in the presence of water. The novel compound N-hydracrylylpyrrolidine may be prepared by the reaction of beta-pripiolactone with a water solution of pyrrolidine. In this reaction the temperature preferably ranges from −10 to 50° C. and, for practical purposes, the amine is present in a molecular amount substantially equal to, or in small excess over, the molecular amount of the lactone, while the molecular amount of water is at least equal to the molecular amount of the lactone.

The N-substituted acrylamides produced by the novel process of this invention may be employed for the preparation of new and useful resins by polymerization and copolymerization in a conventional manner.

The following examples are given to illustrate this invention further.

Example I

A solution of 90 parts by weight (1.26 mol) of pyrrolidene in 200 parts by weight of water is placed in a flask equipped with a stirrer, dropping funnel and thermometer and surrounded with a water-ice bath. 72 parts by weight (1.0 mol) of beta-propiolactone are placed in the dropping funnel and added to the contents of the flask slowly with stirring over a period of 30 minutes. The temperature during the addition is maintained below 25° C. After completion of the addition, the ice bath is removed and the contents stirred for an additional half hour. In order to remove water and excess pyrrolidine the reaction mixture is subjected to distillation first at atmospheric pressure and then at a pressure of 195 mm. of mercury, with a final head temperature of 69° C. The residue, 140.9 parts by weight, contains more than 95% of N-hydracrylylpyrrolidine. On further purification by distillation this liquid, moderately viscous, N-hydracrylyl pyrrolidine shows a refractive index $n_D^{25}$ of 1.5008 and a boiling point of 146° C. at a pressure of 3 mm. of mercury absolute.

Example II 140.9 parts by weight of residue, containing more than 95% of N-hydracrylylpyrrolidine, obtained as in Example I are charged to a distillation flask attached to a catalyst column, which in turn is attached to a condenser. The catalyst column is provided with a heating jacket and is packed with tablets, ⅛ inch in diameter and ⅛ inch long, of activated alumina impregnated with 10% of thoria, known as Harshaw catalyst TH–218T ⅛ made by the Harshaw Chemical Company. Connected with the condenser is a cooled receiver which is provided with a trap for separating any water formed during the reaction. After the system has been placed under a subatmospheric pressure of 2.5 mm. of mercury, the flask is heated to distill the hydracrylylpyrrolidine through the tube of catalyst, which is maintained at a temperature of 298 to 320° C. Distillation is continued for four hours. During this time practically all of the liquid in the flask has passed over the 78 parts by weight of catalyst contained in the catalyst column. The reaction mixture which has collected in the condenser is purified by a vacuum distillation. On analysis it is found to contain 79.2 parts by weight of N-acrylylpyrrolidine.

Example III 149 parts by weight of impure N-methyl hydracrylamide, containing about 75% by weight of this compound and 22% by weight of water, are charged into the apparatus described in Example II. In order to remove the uncombined water by distillation, the system is placed under a subatmospheric pressure of 33 mm. of mercury and the flask is heated until it reaches a temperature of 100° C. Following this, the pressure is reduced to 2 mm. of mercury, the catalyst column is heated to a temperature within the range of 920 to 318° C. and the flask is heated so that its temperature rises gradually from 165 to 210° C. After 134 minutes at the lower pressure practically all of the liquid in the flask has passed over the 78 parts by weight of catalyst contained in the catalyst column. On analysis, the reaction mixture which has collected in the condenser is found to contain 63 parts by weight of N-methyl acrylamide.

Example IV 165 parts by weight of N-phenyl hydracrylamide and 0.25 parts by weight of hydroquinone are charged into the apparatus described in Example II. The catalyst column is heated to 325° C. and the pressure in the system is maintained at 0.8 mm. of mercury absolute. Distillation is continued for 4½ hours. On purification, the distillate is found to contain 50 parts by weight of N-phenyl acrylamide.

It is to be understood that the foregoing detailed description is given merely by way of illustration and that many variations may be made therein without departing from the spirit of my invention.

Having described my invention what I desire to secure by Letters Patent is:

Process for the production of N-acrylylpyrrolidine which comprises dehydrating N-hydracrylylpyrrolidine by passing vapors of said N-hydracrylylpyrrolidine over a catalyst consisting essentially of granules of activated alumina impregnated with thoria, said catalyst being at a temperature of about 275 to 325° C., the space velocity of said vapors with respect to the catalyst being 5 to 500 per hour.

References Cited in the file of this patent

UNITED STATES PATENTS

| | | |
|---|---|---|
| 2,288,197 | Kranzlein | June 30, 1942 |
| 2,375,005 | Kung | May 1, 1945 |
| 2,534,585 | Erickson | Dec. 19, 1950 |
| 2,548,155 | Gresham | Apr. 10, 1951 |
| 2,587,209 | Phillips | Feb. 19, 1952 |

FOREIGN PATENTS

| | | |
|---|---|---|
| 882,123 | France | May 18, 1943 |